United States Patent Office 2,993,778
Patented July 25, 1961

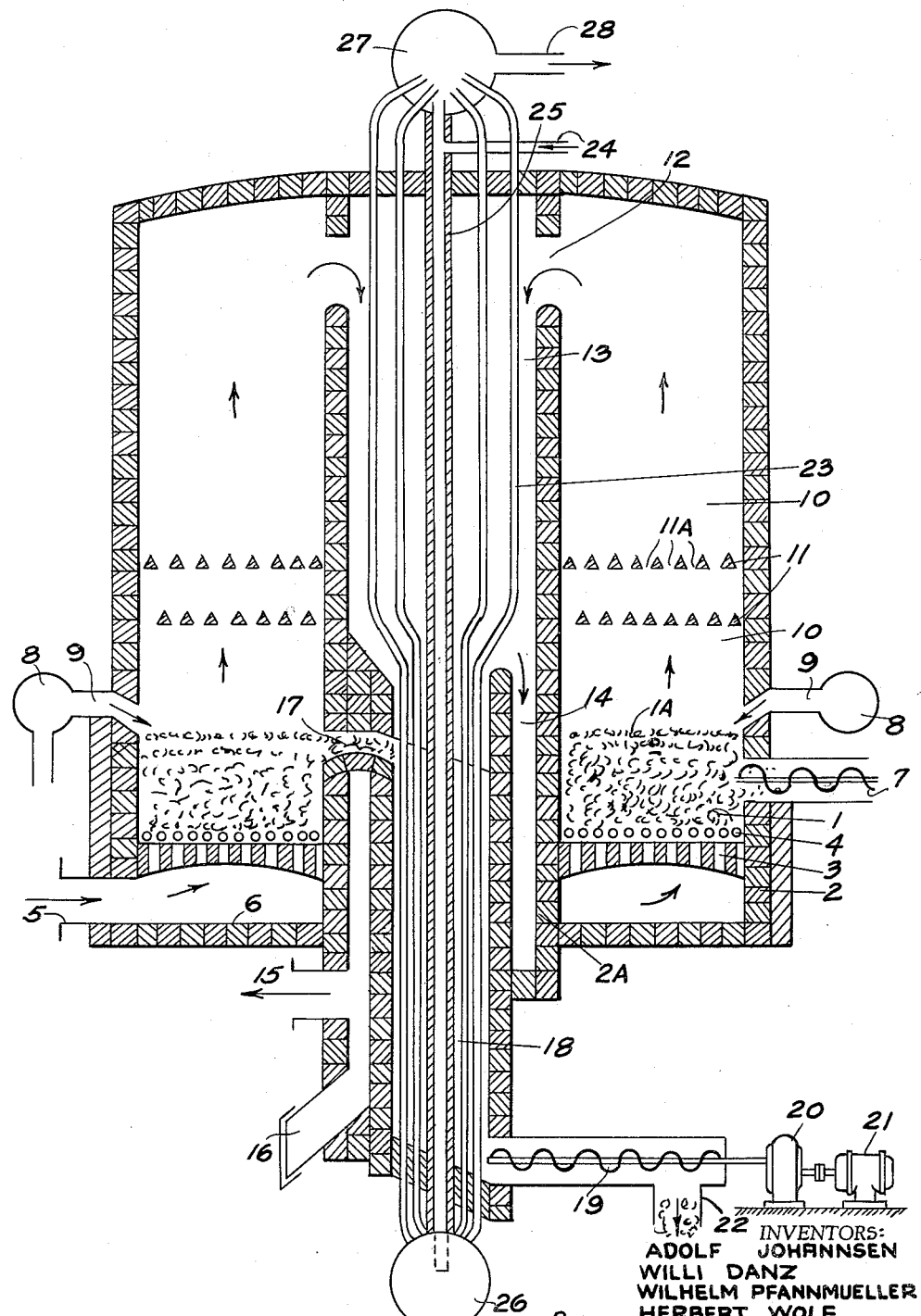

2,993,778
PROCESS FOR ROASTING A SULFUR MINERAL WITH THE PRODUCTION OF SULFUR DIOXIDE
Adolf Johannsen, Ludwigshafen (Rhine), Willi Danz, Ludwigshafen (Rhine)-Oggersheim, Wilhelm Pfannmueller, Mannheim, and Herbert Wolf, Ludwigshafen (Rhine), Germany, assignors to Badische Anilin- & Soda-Fabrik Aktiengesellschaft, Ludwigshafen (Rhine), Germany
Filed Nov. 27, 1957, Ser. No. 699,332
Claims priority, application Germany Dec. 23, 1949
5 Claims. (Cl. 75—9)

This invention relates to a new and improved process for roasting a sulfur mineral with the production of sulfur dioxide. More particularly, the invention relates to a process for increasing the completeness of roasting, the production of sulfur dioxide and the production of metal oxides.

This application is a continuation-in-part of our copending application, Serial No. 197,196, filed November 24, 1950, now U.S. Patent No. 2,889,202, and the disclosure of the latter application is incorporated herein and made a part hereof by reference as fully as if it were set forth herein in its entirety.

In our copending application Serial No. 192,374, filed October 26, 1950, now U.S. Patent 2,761,763, we have described a new and improved process for roasting sulfur minerals, which involves roasting the minerals in a comminuted state in a fluidized bed of roasted material and material undergoing roasting, the roasting and fluidization being effected by passing an oxygen-containing gas through the bed from below. It was found that the sulfur mineral could be supplied to the fluidized bed in a predominant grain size of about 0.1 to 10 millimeters. In this manner, the material to be roasted in the new process need not be reduced to such a fine particle size as was necessary in prior processes.

While the average particle size of the material roasted according to this process is much greater than previously, there are nevertheless considerable quantities of fines or dust present in the material. It is most advantageous that the fines or dust be roasted together with the larger particles, with no need for separation and separate roasting. Generally, the new process is effective to roast various materials having particle sizes within the foregoing limits, in the as produced or as received state. However, where the sulfur mineral to be roasted has a high percentage of particles less than 0.1 millimeter in diameter, above about 30% by weight, an excessive amount of fine material may escape without being sufficiently roasted, as entrained particles in the roaster gases leaving the fluidized bed. Alternatively, if the fluidized bed height is small, that is, below about 50 centimeters in the quiescent state, the very small particles may escape in an incompletely roasted state.

This invention has for its object the provision of a process for overcoming the foregoing problems of escaping incompletely roasted minerals. The invention insures that the total mineral supplied to the fluidized bed will be substantially completely roasted, so that the roasted material or cinder can be used directly for the production of iron, for example, and the whole sulfur content of the minerals is recovered in the form of sulfur dioxide.

The invention provides a unique improvement in the roasting of a sulfur mineral such as comminuted pyrites with the production of sulfur dioxide in a fluidized bed, which involves introducing oxygen containing gas above the bed to roast incompletely roasted mineral fines or dust entrained in the roaster gas leaving the bed. Air or air enriched with oxygen or oxygen gas is introduced into a freeboard space above the bed and adjacent the upper surface of the bed. Preferably cold oxygen containing gas is directed onto the upper bed surface.

The invention finds important application in roasting sulfur mineral containing greater than about 30% by weight of particles having a diameter of less than 0.1 millimeter, or in roasting in a fluidized bed having a height in the quiescent state less than about 50 centimeters. The oxygen containing gas is introduced adjacent the upper surface of the bed, so as to mix with the materials issuing from the upper surface, oxidize the mineral particles to metal oxides and sulfur dioxide, and oxidize any sulfur vapor escaping in the roaster gas. With the preferred provision of cold oxygen containing gas directed onto the surface, the oxygen gas is simultaneously heated to the temperature required for the after-combustion, at the same time serving to cool the fluidized bed. The heat withdrawn from the bed intensifies the thermal convection current in the bed and also that above the bed.

It is further preferred to interrupt the flow of the entrained mineral fines and produce turbulence in the roaster gas in the freeboard space above the bed, to increase the residence time of the entrained mineral fines in the freeboard space and the dispersion of the oxygen gas in the roaster gas, thereby increasing the completeness of roasting. This is preferably effected by providing baffles in the freeboard space above the point or zone of introduction of the oxygen gas.

If oxygen is used in a concentrated form as for example in a technical grade purity of about 90% or more, the balance being substantially nitrogen, a rapid complete after-combustion takes place without substantial dilution of the roaster gases with inert gases. A high concentration of sulfur dioxide in the roaster gases is maintained, with substantially complete oxidation of the metals and recovery of sulfur as sulfur dioxide.

The results achieved by the invention are difficult to obtain by increasing the amount of oxygen supplied in the roasting and fluidizing gas, because a disproportinate amount of roasting gas must be supplied to achieve a comparable result, if it should be avoided in all cases that even by small ups and downs of the throughput the oxygen totally is consumed in the layer and incompletely roasted fine material escapes. By introduction of additional oxygen-containing gas for roasting, the gas velocity through the bed is increased and this increases the tendency of the fine material to escape in the roaster gas. Also, the advantages of cooling the bed in the vicinity of the upper surface and in enhancing the convection currents are not obtained. Likewise, it is much more advantageous to complete the roasting of the fine material in the zone directly above the bed, than to after-roast the fines in separate subsequent apparatus. In this case, the operation does not contribute to the improved operation of the fluidized bed, the conditions of temperature and turbulence are much less favorable or must be supplied by additional measures, and additional equipment and regulation are required.

By the invention, the sulfur mineral is substantially completely roasted in a single operation carried out in a single roasting furnace simply, reliably and very efficiently. Regulation of the roasting is accomplished readily, the introduction of oxygen containing gas above the bed being regulated according to the degree of roast being obtained as ascertained from periodic inspection and according to the conditions in the fluidized bed.

The freeboard space above the fluidized bed constitutes a chamber of relatively wide cross section lined with refractory material, which may be of the same width and area as the fluidized bed, or may be wider, such as widening conically upwardly. The roaster gases flow through the freeboard space at a relatively low velocity, as compared to their velocity through the bed. The provision of baffles or other members in the freeboard space further enhances the after-combustion, by interrupting the flow of the entrained particles and creating turbulences in the roaster gas. The baffles of refractory material containing $Al_2O_3$ and $Fe_2O_3$, also exert a catalytic action at their surfaces, which further facilitates the completion of roasting. The baffles may be in the form of parallel plates which are spaced to provide openings therebetween for the flow of gas. A plurality of superimposed layers of baffles may be provided, with the openings staggered or offset. The baffles preferably are shaped to converge at a point on their top surfaces, and having a triangular cross section, to avoid deposition of the fine material thereon.

The openings into the freeboard space above the bed, for introducing the oxygen containing gas, are preferably arranged about the periphery of the bed, to distribute the oxygen containing gas throughout the area and in a manner such that the gas can be directed to any part of the chamber.

As regards the other conditions of the roasting process in which the foregoing improvements are provided, the process involves substantially completely roasting sulfur minerals or ores, such as pyrites, in a fluidized bed of roasted mineral and mineral undergoing roasting. The roasting is carried out in a continuous manner by supplying fresh mineral continuously or intermittently to a single substantially uniform dense phase fluidized bed which consists predominantly of material which has been completely roasted or substantially so, and roasting in the bed is continuous. The bed preferably contains an average sulfidic sulfur content of less than about 5%, so that the fresh material and the material undergoing roasting is considerably diluted by roasted material, being the oxides of the metals present in the mineral. In this manner, unduly violent reaction, fusion and agglomeration are avoided, while the mineral is roasted to an average sulfidic sulfur content of less than about 1.5%, in the roasted particles removed from the bed, either by direct withdrawal from the bed or as particles entrained in the roaster gases. Roaster gas is produced which preferably contains a minimum amount of unreacted oxygen and of sulfur trioxide. The proportion $O_2:SO_2$ in the roaster gases is preferably less than about 1:7, and the sulfur trioxide content is preferably less than about 1%.

The sulfur mineral is thus roasted in a one-stage process, from fresh or unroasted mineral to substantially completely roasted material. There is no necessity for, and the process is distinct from, roasting in a plurality of stages, counter-current travel of mineral and oxidizing gas, and other special measures.

By reference to a fluidized bed is meant a very dense suspension of small particles in a supporting flowing gas, also referred to as a dense phase fluidized bed or turbulent or whirling layer. Such a bed is maintained in a roaster, reactor or furnace which generally is a vertical vessel having a perforated horizontal partition or grate in its lower portion. Finely divided mineral is supplied to the roaster above the partition, and gas is passed upwardly from the bottom of the roaster through the partition and through the solids thereabove. The sulfur minerals supplied to the fluidized bed may generally have any particle size or distribution predominantly ranging up to about 10 millimeters in diameter, or greater with appropriate particle size distribution.

The fluidized bed is distinct from a bed which is not suspended in a gas, from hindered settling of solids in a gas, and from operation wherein the solids are entrained and carried out of a vessel as a dispersed or dilute suspension in the exit gas. Such a dispersed suspension behaves substantially like a gas and is unlike a fluidized bed, which is characterized by a high state of turbulence or erratic motion and, in general, behaves like a boiling liquid which presents a fluid-level. Roasting in a fluidized bed is also basically different from suspension or flash roasting, wherein very fine particles are injected into a combustion chamber, are temporarily suspended and rapidly roasted due to their fineness, and fall through the chamber.

The fluidized bed depth may vary from about 40 to 100 centimeters in the quiescent state, or about 50 to 150 centimeters in the fluidized or expanded state. Above the bed is a superimposed freeboard or disengaging space, or dispersed or gaseous phase or zone, through which the roaster gases exit containing entrained fine particles. The gas velocity measured in this zone, referred to as superficial velocity, is on the order of 1 to 100 centimeters per second (N.T.P.).

The invention is applicable to any sulfur mineral, particularly sulfidic ores of the pyrites type. The sulfur minerals having an excess of about 20% oxidizable sulfur content are contemplated, and advantages of the invention are realized especially when the sulfur content is in excess of about 30%. For example, materials which are contemplated include iron pyrites having a sulfur content of 40 to 50%, for example Spanish pyrite with 48% S, German zinc-containing pyrite with 39% S, flotation pyrites with 48% S, zincblende (sphalerite) having a sulfur content of 30%.

The roasting process is carried out at a temperature which will result in complete oxidation of the sulfur and the metals, while below the temperature at which the roasted material softens. Fresh material is continuously or intermittently supplied to the bed which is continuously undergoing roasting. Roasted material in proportion to the fresh material is withdrawn directly from the bed and as entrained flue dust.

The hot roaster gas is conducted to apparatus for removing entrained solids, and its sensible heat is removed for utilization, generally by indirect heat exchange and insofar as practicable. The sulfur-dioxide containing roaster gas is then utilized, or a part may be recycled.

The sulfur mineral may be supplied to the fluidized bed at any charging rate within the range of about 50 to 600 kilograms of sulfur content per square meter of layer cross-section per hour, most advantageously, 250 to 400 kilograms per square meter per hour. The cross sectional area referred to contemplates particularly that in the vicinity of the point of introduction of the fresh mineral. In preferred operation, the cross section is substantially the same throughout the fluidized bed, but it may vary, as in a tapered vessel. The oxygen-containing roasting gas such as air or air supplemented with oxygen is generally supplied at the rate of about 1000 to 3000 cubic meters (N.T.P.) per square meter of cross section per hour.

The amount of oxygen-containing gas introduced above the bed is in the range of 5 to 10 percent of the total amount of oxygen-containing gas supplied in the process. Apparatus for carrying out the invention is illustrated by way of example in the attached drawing, which is diagrammatic sectional elevation of a roaster and associated apparatus, including apparatus for removing sensible heat from the roaster gas and from the roasted particles or cinder.

In the drawing, a fluidized bed or turbulent layer 1 is represented in an annular chamber defined by two spaced concentric circular or cylindrical walls 2 and 2A constructed of refractory material. An oxygen containing gas such as air is introduced into the bed from below through a refractory grate 3, upon which is placed a layer of coarse material 4 as a substrate for the material being roasted.

The oxygen-containing gas is introduced through a gas conduit 5, which communicates with an annular wind chamber 6 beneath the grate. Fresh material to be roasted is introduced into the bed 1 by a worm gear 7.

The oxygen gas for after-combustion is supplied from an annular conduit 8, through supply conduits 9 which communicate with the interior of the roasting chamber. The feed conduits 9 are spaced at equal intervals around the periphery of the outer furnace wall 2. The after-combustion takes place in the freeboard space or chamber 10 superimposed upon the fluidized bed 1 in the roasting chamber. The oxygen conduits 9 are directed downwardly onto the upper fluid-like surface 1A of the fluidized bed. On entering the chamber 10, the oxygen gas impinges upon the upper surface of the bed and then flows upwardly together with the roaster gases.

Above the points or zone of introduction of the oxygen gas, two sets of transversely spaced horizontal baffles are provided, one set being spaced above the other in direction of gas flow. The baffles extend substantially over the area of the chamber 10. The roaster gases pass through the openings or channels 11A between the baffles 11, which have triangular cross sections and define upwardly conically widening openings therebetween. The openings 11A of the respective sets of baffles are transversely staggered or offset, so as to increase the residence time of the entrained particles and produce turbulence in the roaster gases admixed with oxygen.

The resulting roaster gases exit from the freeboard space or chamber 10 through openings 12 in the inner furnace wall 2A. The gases then flow through a central shaft 13 and exit through an annular channel 14, leaving the furnace through an outlet conduit 15 at the base. Flue dust is removed from the annular channel 14 at the withdrawal conduit 16 at the base of the channel.

Roasted material is withdrawn from the fluidized bed 1 by overflowing a weir 17 in the inner wall 2A of the furnace, into a central shaft 18 below the roaster gas shaft 13. The roasted material is removed from the lower central shaft by a worm gear 19, driven by a motor 21 and an adjustable gear 20. The material is discharged through an outlet conduit 22.

The central roaster gas shaft 13 and the roasted material or cinder shaft 18 enclose steam generation tubes 23 of a circulation boiler. Feed water is supplied by a feed pipe 24 at the top of the furnace, to a central circulation pipe 25, which extends to the base of the steam generation pipes and the furnace, where it enters a distributing drum 26. This drum supplies water to the steam generation tubes 23, and the water ascends therein. The water in the tubes absorbs sensible heat from the roasted material in the lower shaft 18, and from the roaster gases in the upper shaft 13, by indirect heat exchange therewith. Superheated steam is generated in the tubes, and it is collected in a collector drum 27 at the top of the apparatus, from which it is withdrawn through a conduit 28.

*Example*

Flotation concentrate containing besides iron 42% sulfur, 4.5% zinc and 4% moisture is supplied at the rate of 4900 kilograms per hour to a fluidized layer surface having a grate surface of 6.5 square metres. The grain sizes of the concentrate are as follows:

| | Percent |
|---|---|
| +0.2 mm | 5 |
| +0.1 mm | 27 |
| +0.075 mm | 19 |
| +0.060 mm | 18 |
| −0.060 mm | 31 |

Into the fluidized layer consisting predominantly of substantially roasted material there are introduced 9000 cubic metres of cold air per hour from below through the grate. The temperature in the layer is maintained at 940° C. by cooling devices arranged in the layer. Onto the surface of the layer there are blown 1000 cubic metres of cold air per hour from different points. The temperature in the space above the fluidized layer rises up to 1080° C. by the after-combustion of the material which in subordinate amounts is withdrawn from the layer by the roaster gases leaving that layer. The sensible heat of the dust-containing roaster gases is utilized in a subsequent waste heat boiler over a temperature interval down to 350° C. In the cooling devices arranged in the fluidized layer and in the waste heat boiler about 1.3 tons of vapour at a pressure of 40 atmospheres and a temperature of 400° C. are produced per hour. The average sulfur-content of the after-combusted material which settles mainly in the waste heat boiler and in the subsequent electrical gas purification plant is 1.2%. The concentration of sulfur dioxide in the roaster gases amounts to 13.5%.

If no air is blown onto the surface of the layer the sulfur-content of the dusty roasted material increases markedly and incrustments of sulfidic masses are formed at the tubes of the waste heat boiler.

The invention is hereby claimed as follows:

1. A one-stage process for the production of gases containing sulfur dioxide from a sulfidic ore which comprises: roasting a sulfur mineral containing more than about 30% by weight of particles having a diameter of less than 0.1 mm. in a single substantially uniform fluidized bed of roasted mineral and mineral undergoing roasting, maintaining the height of said bed below a maximum of about 100 centimeters when measured in the quiescent state, said bed having a superimposed freeboard space, carrying out the roasting at a bed temperature below the softening point of said roasted ore, and introducing oxygen-containing gas into said freeboard space and adjacent the upper surface of said bed to roast incompletely roasted mineral fines entrained in the roaster gas leaving the bed, and interrupting the flow of said entrained mineral fines and producing turbulence in said roaster gas in said freeboard space to increase the residence time of the mineral fines in the freeboard space and the dispersion of said oxygen-containing gas, whereby the roasting of said mineral is completed to the extent that the average sulfidic content of the roasted particles is less than about 1.5%.

2. A process as in claim 1 wherein the oxygen-containing gas is cold.

3. A process as in claim 1 wherein the amount of cold oxygen-containing gas introduced into the freeboard space amounts to from about 5% to about 10% of the total amount of oxygen-containing gas supplied in the roasting process.

4. A one-stage process for the production of gases containing sulfur dioxide from a sulfidic ore which comprises: roasting a sulfur mineral containing more than about 30% by weight of particles having a diameter of less than 0.1 mm. in a single substantially uniform fluidized bed of roasted mineral and mineral undergoing roasting, maintaining the height of said bed below a maximum of about 100 centimeters when measured in the quiescent state, said bed having a superimposed freeboard space, said superimposed freeboard space widening conically from the upper surface of said bed, carrying out the roasting at a bed temperature below the softening point of said roasted ore, and introducing oxygen-containing gas into said freeboard space and adjacent the upper surface of said bed to roast incompletely roasted mineral fines entrained in the roaster gas leaving the bed, whereby the average sulfidic content of the roasted particles is less than about 1.5%.

5. A one-stage process for the production of gases containing sulfur dioxide from a sulfidic ore which comprises: roasting a sulfur mineral containing more than about 30% by weight of particles having a diameter of less than 0.1 mm. in a single substantially uniform fluidized bed of roasted mineral and mineral undergoing roasting, maintaining the height of said bed below a maximum of about 100 centimeters when measured in the quiescent state, said bed having a superimposed freeboard space, said superimposed freeboard space widening conically from the upper surface of said bed, carrying out the roasting at a bed temperature below the softening point of said roasted ore, and introducing oxygen-containing gas into said freeboard space hrough a plurality of openings arranged around the periphery of said bed and adjacent the upper surface of said bed to roast incompletely roasted mineral fines entrained in the roaster gas leaving the bed, whereby the average sulfidic content of the roasted particles is less than about 1.5%.

References Cited in the file of this patent

UNITED STATES PATENTS

| | | |
|---|---|---|
| 2,393,704 | Ogorzaly | Jan. 29, 1946 |
| 2,398,443 | Munday | Apr. 16, 1946 |
| 2,540,593 | Ogorzaly | Feb. 6, 1951 |
| 2,596,954 | Heath | May 13, 1952 |
| 2,621,118 | Cyr et al. | Dec. 9, 1952 |
| 2,733,137 | Swaine et al. | Jan. 31, 1956 |
| 2,761,763 | Johannsen | Sept. 4, 1956 |

FOREIGN PATENTS

| | | |
|---|---|---|
| 1,096,710 | France | Jan. 23, 1955 |

OTHER REFERENCES

Chemical and Metallurgical Engineering, "Improving Solids-Gas Contacting by Fluidization," June 1944, pp. 94–98.